United States Patent [19]

Kincaid

[11] Patent Number: 5,701,038
[45] Date of Patent: Dec. 23, 1997

[54] CURRENT FEEDBACK CONTROL OF AC DEPLOYMENT CURRENT FOR SUPPLEMENTAL INFLATABLE RESTRAINTS

[75] Inventor: Kevin Dale Kincaid, Kokomo, Ind.

[73] Assignee: Delco Electronics Corp., Kokomo, Ind.

[21] Appl. No.: 686,890

[22] Filed: Jul. 26, 1996

[51] Int. Cl.⁶ ........................................... B60R 21/32
[52] U.S. Cl. ..................... 307/10.1; 307/9.1; 180/268; 180/271; 280/728.1; 280/734; 280/735; 364/424.034; 364/424.055; 364/424.057
[58] Field of Search .................. 361/251; 364/424.034, 364/424.035, 424.036, 424.045, 424.055, 424.056, 424.057; 307/4.1, 10.1; 180/268, 271, 272, 274, 282; 280/728.1, 734, 735; 340/436

[56] References Cited

U.S. PATENT DOCUMENTS

| | | | |
|---|---|---|---|
| 5,146,104 | 9/1992 | Schumacher et al. | 307/10.1 |
| 5,309,030 | 5/1994 | Schultz | 307/10.1 |
| 5,343,394 | 8/1994 | Takeuchi | 307/10.1 |
| 5,420,790 | 5/1995 | Ravas | 307/10.1 |
| 5,554,890 | 9/1996 | Kinoshita | 307/10.1 |
| 5,597,179 | 1/1997 | Kornhauser | 280/735 |

*Primary Examiner*—William M. Shoop, Jr.
*Assistant Examiner*—Peter Ganjian
*Attorney, Agent, or Firm*—Mark A. Navarre

[57] ABSTRACT

The firing loop of a SIR system has a firing element, a capacitor for passing AC pulses to the element and an inductance which varies according to application. A current sensor monitors each pulse and detects a threshold crossing on the trailing side of the pulse, and a toggle circuit operates a switch arrangement to terminate the pulse and initiate the next pulse of opposite polarity. This current feedback circuit varies the pulse frequency according to the loop inductance but the RMS loop current is independent of inductance.

10 Claims, 3 Drawing Sheets

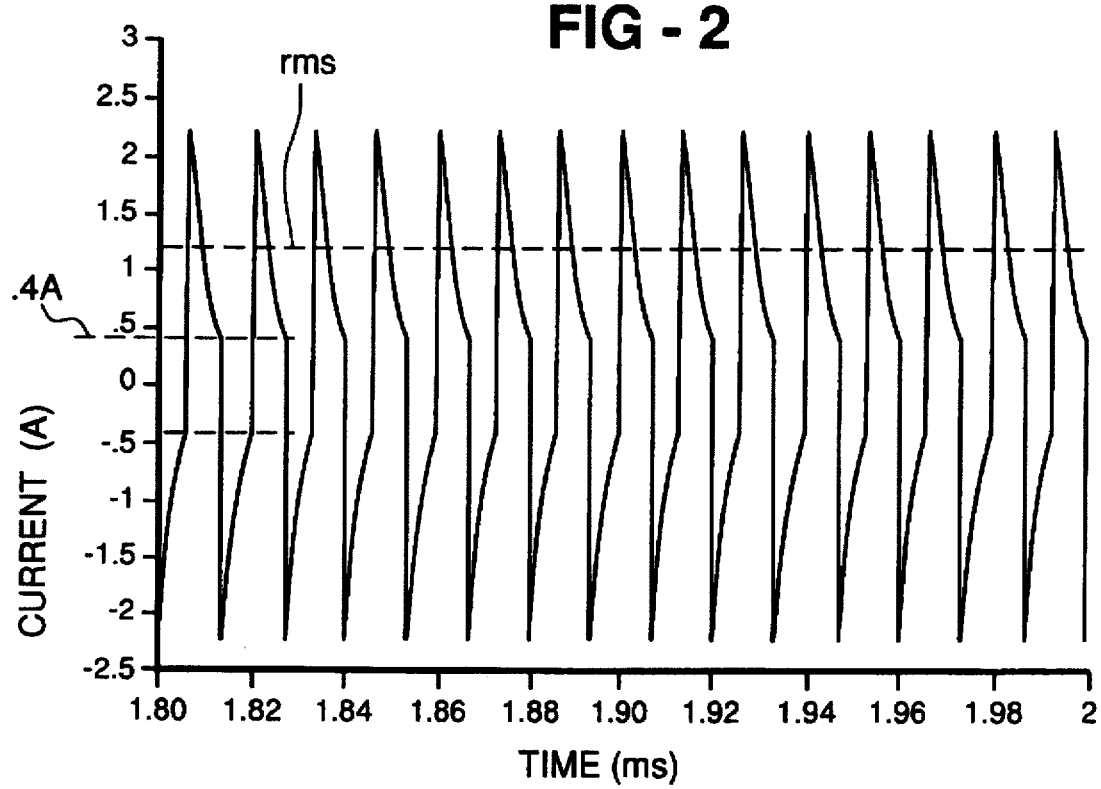
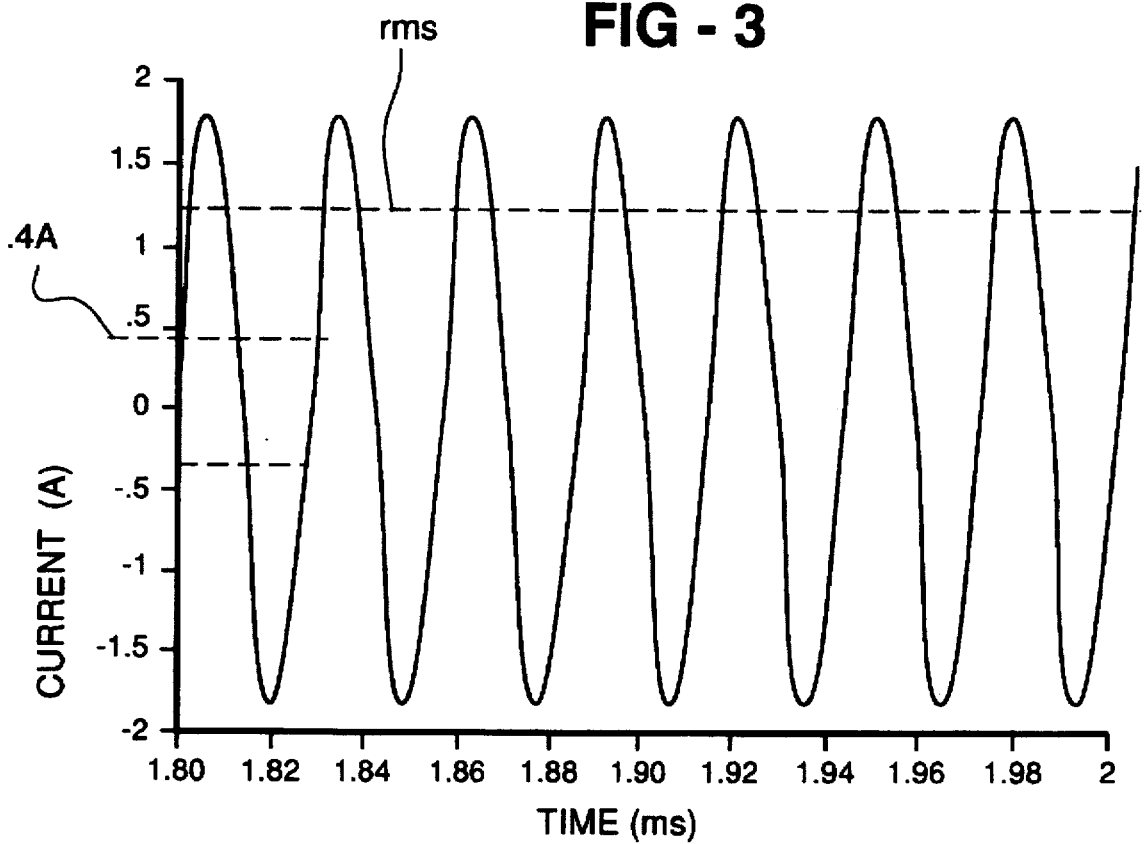

CURRENT FEEDBACK CONTROL OF AC DEPLOYMENT CURRENT FOR SUPPLEMENTAL INFLATABLE RESTRAINTS

FIELD OF THE INVENTION

This invention relates to control of supplemental inflatable restraints (SIR) and particularly to control of deployment current by current feedback.

BACKGROUND OF THE INVENTION

Supplemental inflatable restraint (SIR) systems for automotive vehicles generally employ a firing circuit having a firing element called a squib or initiator for causing inflation of an air bag, and a deployment circuit having an accelerometer sensitive to vehicle motion, especially deceleration, and a microprocessor monitoring the accelerometer output for evaluating the severity of a crash to determine whether to deploy the air bag. The vehicle battery or ignition system voltage empowers the deployment circuit and the firing circuit. The deployment circuit and the firing circuit are to a large extent carried out by a microprocessor on an integrated circuit chip, but an external harness leads to the squib or initiator at the site of each air bag. The harness has an inductance which varies greatly from one application to another due to the harness length and its routing.

The firing circuit employs switches (either solid state or electromechanical) which are used to connect the firing element to the rest of the deployment circuitry. In a typical system the activation of these switches results in DC current flow through the firing element that is sufficient to initiate deployment of the device. To ensure a high level of reliability for the system it is important that all elements involved with the deployment be testable. A disadvantage of this type of firing circuit is the potential effect of a vehicle wiring harness fault that occurs during the test of one of the switching elements. The wiring harness fault may bypass one or more of the switching elements and allow high levels of current flow through the firing element. This can lead to an inadvertent deployment of the SIR system.

An alternative technique is to couple a capacitor in series with the firing element, as described in U.S. Pat. No. 5,146,104 to Schumacher et al which is incorporated herein by reference. Deployment occurs by alternately charging and discharging the capacitor using a series of fixed time duration pulses. Cumulatively the AC pulses deliver sufficient energy to the firing element to cause deployment. However the capacitor value can be selected such that the energy delivered to the firing element during the direct application of voltage, for example by a wiring harness fault, is not sufficient to result in deployment.

The firing elements connected to a firing loop are sensitive to the level of current flow through the device. These elements typically consist of a resistive bridge wire with a chemical packaged in close proximity to the bridge wire. These devices are actuated by running a high level of current through the bridge wire. The current flow through the bridge wire generates heat which is in turn transferred to the chemical charge. If the energy transfer is of a sufficient magnitude to heat the chemical to the required temperature then a chemical reaction occurs which generates a gas and causes the air bag to inflate. It is important in the design of the deployment circuitry that proper energy transfer can occur under all known load conditions.

Since the firing elements are connected to the control circuit by a wiring harness, the amount of resistance and inductance associated with the firing loop varies as a function of the wire length. The amount of inductance is also affected by the routing of the wiring harness within the vehicle. The value of the coupling capacitor will vary according to the specified tolerance of the device. It can be shown that variations in the values of the resistance, capacitance, and inductance result in different levels of energy being transferred to the firing element for a given pulse width. It is necessary to ensure that for a given application the energy transfer will be adequate for deployment. As a result it may be necessary to specially design the firing circuit or at least trim the circuit to operate properly with each type of harness. It is desirable, however, to avoid such special design by a firing circuit which is applicable to a wide range of firing loops and thus has universal application without special tuning.

SUMMARY OF THE INVENTION

It is therefore an object of the invention for a SIR firing circuit having an AC deployment current to accommodate a wide range of firing loops properties without special tuning. It is another object in such a firing circuit to afford a substantially constant RMS current for a wide range of loads.

The firing loop of a SIR system contains a capacitor in series with the firing element and a firing circuit, when activated by a deployment command, asserts a series of AC current pulses on the loop sufficient to deploy the firing element. A first switch couples a power supply to the firing loop to charge the capacitor and a second switch, in counter phase to the fast switch, couples a return path to the firing circuit to discharge the capacitor. A first current sensor monitors the charge current and detects when the pulse diminishes and crosses a preset switching threshold, and a second current sensor does the same for the discharge current. A flip-flop circuit toggles both switches each time a current pulse reaches the switching threshold to immediately switch pulse polarity. Due to this current feedback arrangement, the switching frequency automatically adjusts according to the impedance of the firing loop to produce a predetermined RMS value of the AC deployment current. A switching threshold can be selected to ensure an adequate and constant RMS current over a large range of firing circuit inductance.

BRIEF DESCRIPTION OF THE DRAWINGS

The above and other advantages of the invention will become more apparent from the following description taken in conjunction with the accompanying drawings wherein like references refer to like parts and wherein:

FIGS. 2 and 3 are graphs of output current pulses for different inductance values;

DESCRIPTION OF THE INVENTION

Figure 1:
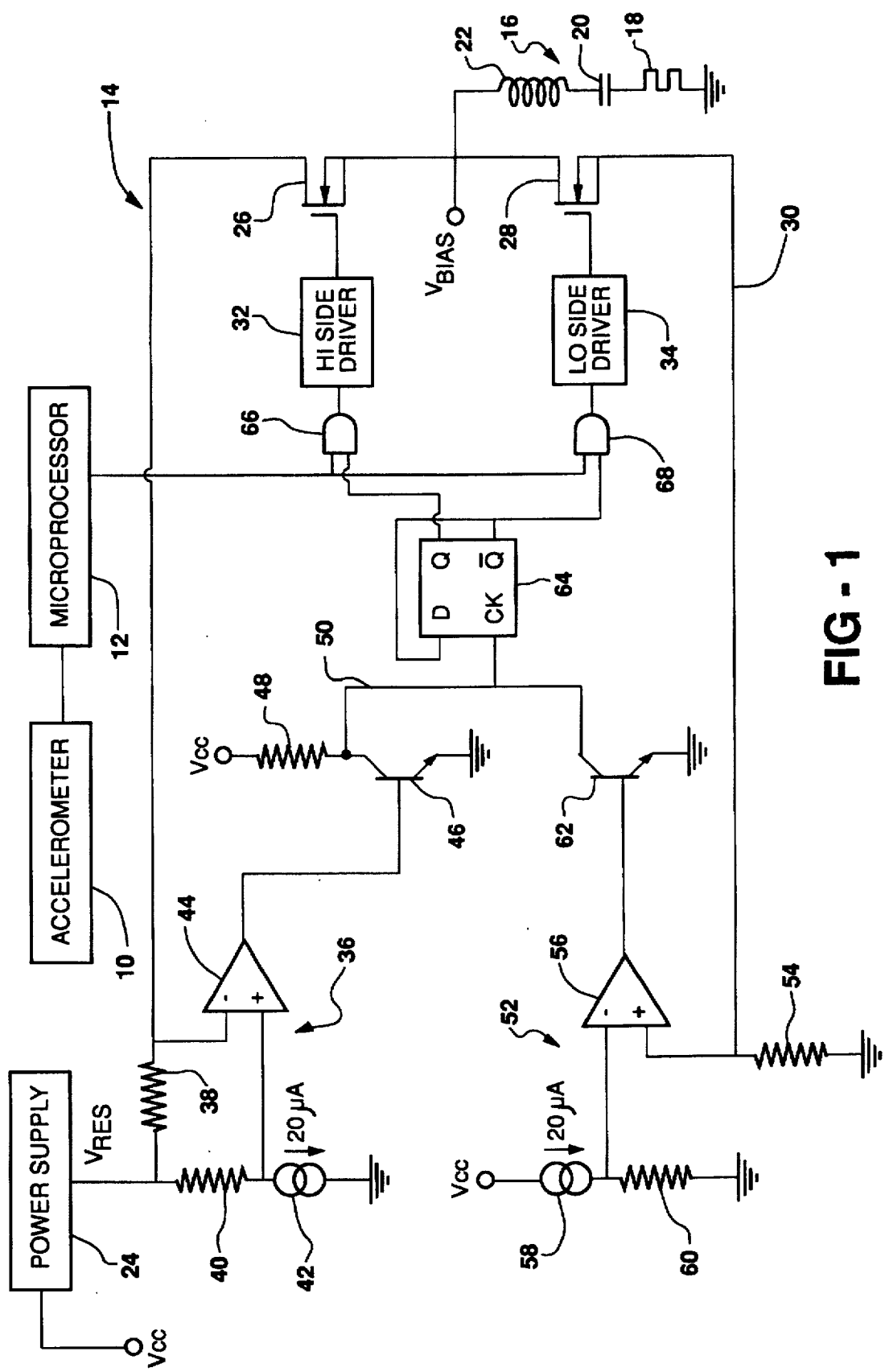
FIG. 1 is a schematic diagram of a SIR system having a firing circuit according to the invention.

Referring to FIG. 1, a supplemental inflatable restraint (SIR) control for inflating an air bag (not shown) includes an accelerometer 10 which senses vehicle acceleration coupled to a microprocessor 12 which interprets acceleration data and decides when to deploy the air bags. This portion of the system is considered to be the deployment circuit. A deployment command from the microprocessor is sent to a firing circuit 14 which supplies AC pulses to one end of a firing loop 16. The firing loop is grounded at the other end and comprises a vehicle wiring harness external to the firing circuit 14 and includes a firing element also called a squib or initiator 18, and a capacitor 20. The capacitor is small enough to limit a pulse due to shorting of the wiring harness to a current insufficient to deploy the firing element, but large enough for several cumulative pulses to cause deployment. The firing loop also has a substantial inherent inductance 22 which may range from 1 to 30 µH, for example, depending on the length and routing of the harness.

A power supply 24 provides a reserve voltage $V_{RES}$ which may be 15 or 25 volts, for example, for supplying the current to the firing loop 16. A high side FET or charge switch 26 between the power supply 24 and the firing circuit admits current pulses to charge the capacitor 20 and a low side FET or discharge switch 28 couples a grounded return path 30 to the firing loop to discharge the capacitor. A high side gate driver circuit 32 controls the switch 26 and a low side gate driver circuit 34 controls the switch 28. A current feedback arrangement triggers the switches such that when a deploy command is given the gate drivers are alternately enabled so that alternate current pulses flow in the firing loop.

A first current sensor 36 comprises a small current sensing resistor 38 in series with the switch 26 and the power supply 24, a reference resistor 40 in series with the power supply and a current sink 42, and a comparator 44 having its negative input at the low voltage side of the sensing resistor 38 and its positive input at the low voltage side of the reference resistor 40. The voltage across the reference resistor 40 is about 0.5 v, for example and the current sensing resistor 38 is selected to develop that same voltage at the desired switching current threshold. When the switch 26 is closed a current pulse will flow as determined by the impedance of the firing loop 16. Initially the comparator 44 output will be low but as the pulse current increases to the switching threshold the voltage decreases on the negative input and the comparator switches to yield a high output. As the pulse current passes its peak and then crosses the desired switching threshold, the comparator will switch back to a low output. An NPN transistor 46 with a grounded emitter has its collector connected to $V_{cc}$ via a pull-up resistor 48 and its base is coupled to the comparator output. The transistor inverts the comparator output to produce a clock signal on clock line 50 which is normally high and then goes low after the beginning of a pulse and then goes high as the pulse diminishes and then crosses the switching threshold.

A second current sensor 52 comprises a current sensing resistor 54 in the return line 30, a comparator 56 having its positive input connected to the high side of the resistor 54, a current source 58 and a reference resistor 60 serially connected between $V_{cc}$ and ground with the high side of the resistor connected to the negative input of the comparator 56. This current sensor 52 operates much like the sensor 36, producing a high output for high values of the discharge current in the return line and going low as the diminishing current pulse crosses the current switching threshold. The resistors are selected to yield the same current switching threshold as in sensor 36. An NPN transistor 62 controlled by the comparator 56 output connects the clock line to ground when the discharge pulse is high and effects a high clock signal when the switching threshold is crossed.

The two transistors 46 and 62 form a clock circuit for producing a rising clock signal on line 50 each time a current pulse of either polarity flowing through the firing loop declines to the current threshold. These two transistors combined with a D type flip-flop 64 comprise a toggle circuit. The flip-flop has its clock input connected to the clock line 50, and its/Q output coupled to the data input. The Q output is coupled through an AND gate 66 to the high side driver 32 and the/Q output is connected through an AND gate 68 to the low side driver 34. The deploy command signal from the microprocessor 12 is connected to each AND gate to enable the gates. Both outputs of the flip-flop 64 will change state at each rising edge of the clock signal thereby toggling the drivers 32 and 34, if the deploy command is present, causing the switches 26 and 28 to simultaneously switch on and off in opposite phase.

An intermediate value bias voltage $V_{BIAS}$ is applied to the firing loop primarily for diagnostic purposes. This has the effect of normally keeping the capacitor 20 partially charged. Then when the microprocessor 12 first issues a deployment command and if the flip-flop/Q output happens to be initially high, discharge current will flow in the return circuit 30 to trigger the current sensor 52. If the Q output is initially high the charge current will trigger the current sensor 36. In either case the series of alternate polarity pulses will commence. The resulting firing loop current is shown in FIGS. 2 and 3. In FIG. 2, the circuit parameters are $V_{RES}$=15v, capacitor 20 is 0.68 µF, loop resistance is 5.25 ohms and the inductance 22 is 1 µH. The switching threshold of the current sensors is set to 0.4 A. The parameters are the same for FIG. 3 except that the inductance is 30 µH. It is obvious that the circuit dynamics altered the pulse frequency in response to the inductance values, but the RMS current remained the same at 1.28 A as shown by the dashed line. The effect of the switching at the 0.4 A threshold (both positive and negative) is best observed in FIG. 2 as a break in the trailing side of each pulse at the 0.4 A level. The same effect is shown in FIG. 3 but is less evident.

Figure 4:
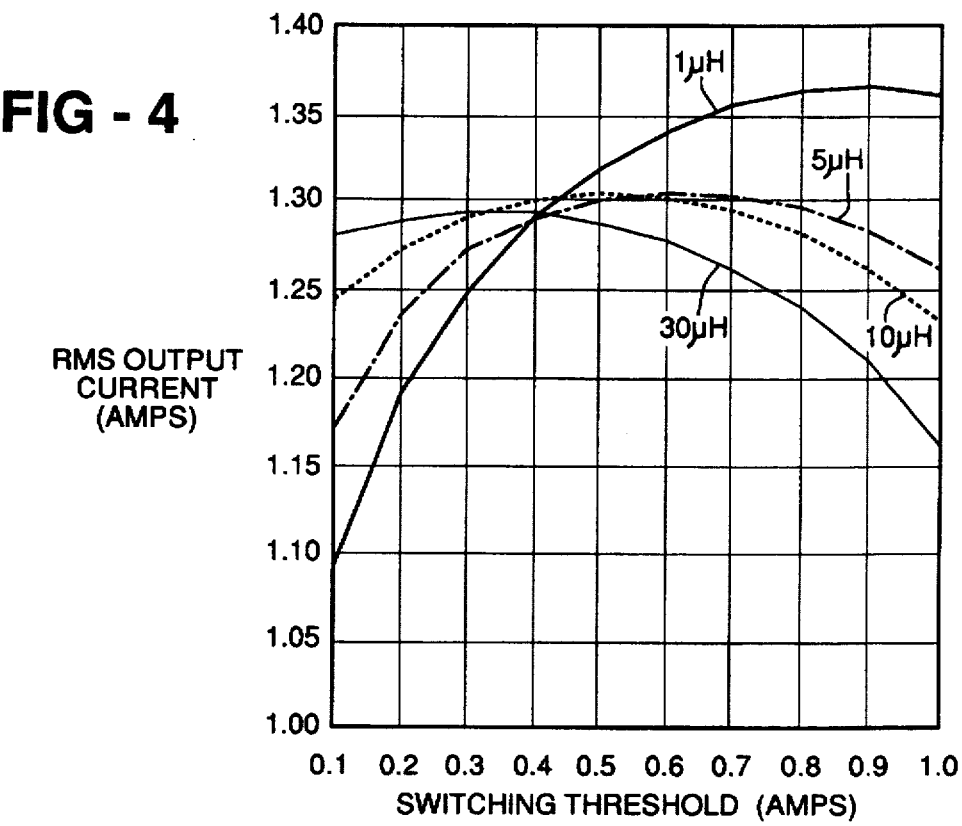
FIG. 4 is a graph of output current vs. various switching thresholds.
Figure 5:
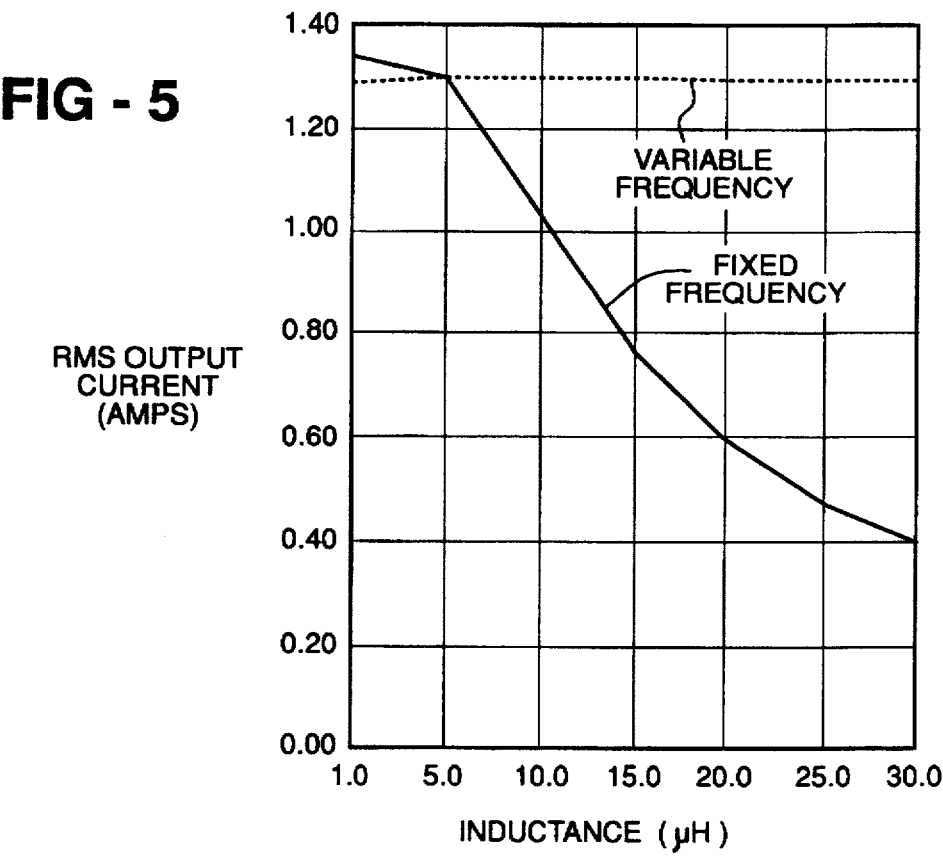
FIG. 5 is a graph of output current vs. inductance for the circuit of FIG. 1 and for the prior art circuitry.

It is necessary to choose a switching threshold which yields an RMS current which is sufficient (higher than 1.2 A) and which is substantially independent of the circuit inductance. This is possible as shown in FIG. 4 which is a graph of RMS output vs. switching threshold for various inductances. The outputs are all nearly the same for a switching threshold of 0.4 A which yields 1.28 A RMS current at a supply voltage of 15v. Other threshold values will result in various output currents and in some cases are below the level required for deployment. FIG. 5 shows the RMS output current for various values of loop inductance for this variable frequency circuit and for the prior art fixed frequency circuit operating at 100 kHz. The fixed frequency control has an unacceptably low output for inductance values above about 7 µH whereas the variable frequency control technique has the same high output across the inductance range.

It is apparent then that the expedient of current feedback for controlling the current pulses in a SIR firing circuit permits a specific circuit design which operates properly over a wide range of loop inductance without special tuning to match to the load.

The embodiments of the invention in which an exclusive property or privilege is claimed are defined as follows:

1. A method of operating a supplemental inflatable restraint system having a firing circuit including an initiator and a deployment circuit coupled to the firing circuit for firing the initiator, comprising the steps of:

supplying a series of current pulses of alternating polarity to the firing circuit, the current of each such pulse having a magnitude which first increases and then decreases;

sensing the current in each pulse; and terminating a present pulse associated with the sensed current and starting a next successive pulse of said series when such sensed current decreases below a threshold, so as to automatically adjust the frequency of said alternating polarity current pulses in an amount required to maintain the RMS value of the firing circuit current at a predefined value over a range of firing circuit inductance.

2. The method as defined in claim 1 wherein:

the step of sensing the current comprises separately sensing each direction of current supplied to the firing circuit to produce first and second detection signals; and the step of alternating the direction of current occurs in response to both of said first and second detection signals.

3. In a supplemental inflatable restraint system having a firing loop including an initiator, a capacitor and stray inductance in series, a charge switch effective when enabled to connect the firing loop across a power supply path to charge the capacitor and a discharge switch effective when enabled to connect the firing loop across a return path to discharge the capacitor, the method of controlling the firing loop current comprising the steps of:

monitoring current in the power supply and return paths; and alternately enabling the charge switch and the discharge switch mutually exclusively to produce a train of alternate charge and discharge pulses, respectively, the charge switch being enabled when the monitored current is diminishing and crosses a discharge current threshold during a discharge pulse, and the discharge switch being enabled when the monitored current is diminishing and crosses a charge current threshold during a charge pulse so as to automatically adjust the switching frequency of said charge and discharge switches in an amount required to maintain the RMS value of the firing circuit current at a desired value over a range of said stray inductance.

4. A current control for a supplemental inflatable restraint system supplied by a power supply and having a firing loop including an initiator, a capacitor and stray inductance in series, the current control comprising:

a switching circuit for applying current pulses of alternating polarity to the firing loop at a switching frequency determined by a logic circuit;

current sense means for sensing current applied to said firing loop by said switching circuit and detecting when a diminishing current crosses a current threshold; and said logic circuit being coupled to the current sense means and to the switching circuit for terminating a present current pulse associated with the sensed current and beginning a succeeding pulse of opposite polarity when crossing a current threshold is detected, thereby to automatically control the switching frequency of said switching circuit for maintaining the RMS value of the firing loop current at a desired value over a range said stray inductance.

5. The current control as defined in claim 4 wherein the current sense means includes:

at least one resistor in a current path of said switching circuit for developing a voltage corresponding to the current applied to said firing loop by said switching circuit;

a reference voltage representing the current threshold; and a comparator responsive to the developed voltage and the reference voltage for generating an output when the developed voltage falls below the reference voltage.

6. The current control as defined in claim 4 wherein:

the switching circuit includes separate switches for supplying pulses of each polarity; and the logic circuit has an logic output to each switch and comprises means responsive to the current sense means for toggling the states of the outputs for each switch.

7. A current control for a supplemental inflatable restraint system supplied by a power supply and having a firing loop including an initiator, a capacitor and stray inductance in series, a charge switch for connecting the firing loop across a power supply path to charge the capacitor and a discharge switch for connecting the firing loop across a return path to discharge the capacitor, comprising:

a gate driver for operating each of said charge and discharge switches, whereby upon switch operation a current pulse flows in the firing loop;

current sensor means for sensing when each current pulse flowing through the firing loop declines to a current threshold; and a toggle circuit responsive to the current sensor means and coupled to each gate driver for alternately operating each gate driver, whereby the pulse frequency is controlled to maintain the RMS value of the current flowing in the firing loop at a desired value over a range said stray inductance.

8. The current control as defined in claim 7 wherein the toggle circuit comprises:

a clock circuit connected to the current sensor means for producing a rising clock signal each time a current pulse flowing through the firing loop declines to the current threshold; and a logic circuit receiving the clock signal and having two outputs of opposite states coupled to the respective gate drivers, the logic circuit having means for switching the states of the outputs for each rising clock signal.

9. The current control as defined in claim 8 wherein the logic circuit comprises a flip-flop.

10. The current control as defined in claim 7 wherein the current sensor means comprises;

a first sense resistor in the power supply path of current flowing to the firing loop for developing a first voltage representing current amplitude, and a first comparator for comparing the fast voltage to a first threshold voltage so that the first comparator changes state when the increasing pulse current breaches the current threshold and again when the decreasing current breaches the current threshold; and a second sense resistor in the return path of current flowing from the firing loop for developing a second voltage representing current amplitude, and a second comparator for comparing the second voltage to a second threshold voltage so that the second comparator changes state when the increasing pulse current breaches the current threshold and again when the decreasing current breaches the current threshold.

\* \* \* \* \*